United States Patent
Jaradi et al.

(10) Patent No.: US 11,427,150 B1
(45) Date of Patent: Aug. 30, 2022

(54) SEATBACK SUPPORTED AIRBAGS RELEASABLY CONNECTED BY A BUCKLE AND CLIP

(71) Applicant: Ford Global Technologies, LLC, Dearborn, MI (US)

(72) Inventors: Dean M. Jaradi, Macomb, MI (US); S.M. Iskander Farooq, Novi, MI (US); Mohammad Omar Faruque, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/373,079

(22) Filed: Jul. 12, 2021

(51) Int. Cl.
    *B60R 21/2338* (2011.01)
    *B60R 21/207* (2006.01)
    *B60R 21/231* (2011.01)

(52) U.S. Cl.
    CPC ........ *B60R 21/2338* (2013.01); *B60R 21/207* (2013.01); *B60R 2021/23107* (2013.01); *B60R 2021/23388* (2013.01)

(58) Field of Classification Search
    CPC .............. B60R 21/2338; B60R 21/207; B60R 2021/23107; B60R 2021/23388
    See application file for complete search history.

(56) References Cited

U.S. PATENT DOCUMENTS

| | | | |
|---|---|---|---|
| 10,189,431 B2 | 1/2019 | Yamamoto et al. | |
| 11,214,226 B2 * | 1/2022 | Nagasawa | B60R 21/207 |
| 2019/0023214 A1 * | 1/2019 | Kitagawa | B60R 21/01534 |
| 2020/0070767 A1 | 3/2020 | Kuepper et al. | |
| 2020/0101931 A1 * | 4/2020 | Nagasawa | B60R 21/2334 |
| 2020/0164828 A1 * | 5/2020 | Park | B60R 21/207 |
| 2020/0398781 A1 * | 12/2020 | Faruque | B60R 21/231 |

FOREIGN PATENT DOCUMENTS

| | | |
|---|---|---|
| DE | 102019118845 A1 | 1/2021 |
| FR | 2927592 B1 | 2/2008 |
| JP | 5798819 B2 | 10/2015 |
| JP | 6426553 B2 | 11/2018 |
| WO | WO-2019244767 A1 * | 12/2019 |

\* cited by examiner

*Primary Examiner* — Drew J Brown
(74) *Attorney, Agent, or Firm* — Frank A. MacKenzie; Bejin Bieneman PLC

(57) ABSTRACT

An assembly for a vehicle includes a seat. The assembly includes a first airbag and a second airbag each supported by the seat. The first airbag and the second airbag are inflatable to an inflated position. The assembly includes a buckle fixed to one of the first airbag and the second airbag and a clip fixed to the other of the first airbag and the second airbag. The clip is releasably connected to the buckle. The assembly includes a non-inflatable panel having a joint fixed to the first airbag and a releasable fastener releasably connected to the second airbag.

19 Claims, 6 Drawing Sheets

SEATBACK SUPPORTED AIRBAGS RELEASABLY CONNECTED BY A BUCKLE AND CLIP

BACKGROUND

A vehicle may include amenities that allow occupants to face one another during operation of the vehicle. As one example, an autonomous vehicle may be autonomously operated, allowing occupants of the vehicle to ride in the vehicle without monitoring the operation of the vehicle. Specifically, the autonomous vehicle may include seats free to rotate between rides of the vehicle between forward-facing and rearward-facing positions.

DETAILED DESCRIPTION

Figure 1:
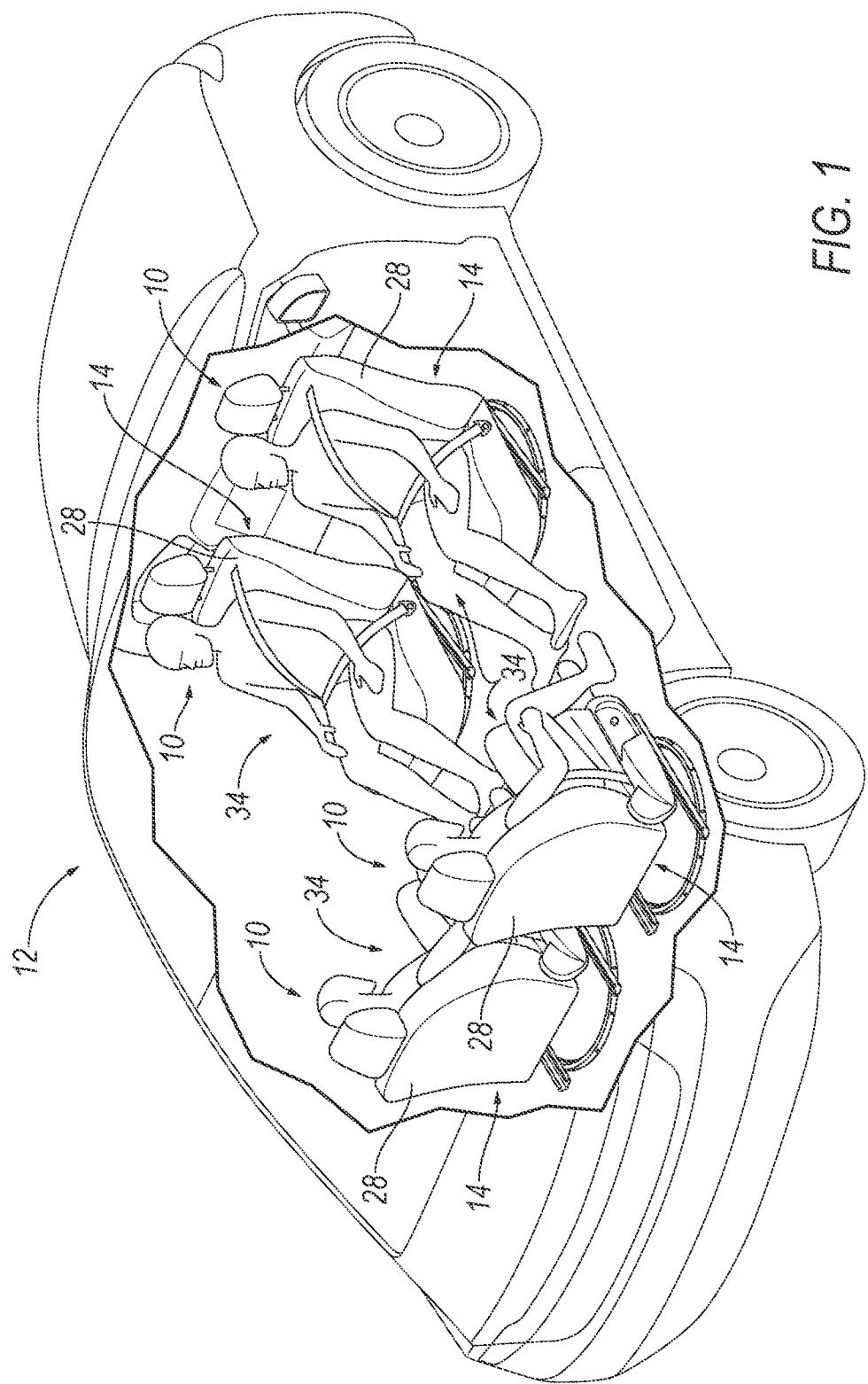
FIG. 1 is a perspective view of a vehicle having a plurality of rotatable seats.

An assembly includes a seat. The assembly includes a first airbag and a second airbag each supported by the seat. The first airbag and the second airbag are inflatable to an inflated position. The assembly includes a buckle fixed to one of the first airbag and the second airbag and a clip fixed to the other of the first airbag and the second airbag. The clip is releasably connected to the buckle. The assembly includes a non-inflatable panel having a joint fixed to the first airbag and a releasable fastener releasably connected to the second airbag.

The first airbag and the second airbag may each include an outer panel and an inner panel between the outer panel and the seat, the buckle being fixed to the outer panel of the one of the first airbag and the second airbag, the clip being fixed to the outer panel of the other of the first airbag and the second airbag, the non-inflatable panel being connected to the inner panel of the first airbag and the second airbag.

The assembly may include a second buckle and a second clip spaced from the buckle and the clip, the second buckle being fixed to one of the first airbag and the second airbag, the second clip fixed to the other of the first airbag and the second airbag, and the second clip being releasably connected to the second buckle.

The second buckle may be fixed the outer panel of one of the first airbag or the second airbag and the second clip is fixed to the outer panel of the other of the first airbag or the second airbag.

The second buckle may be fixed the inner panel of one of the first airbag or the second airbag and the second clip is fixed to the inner panel of the other of the first airbag or the second airbag.

The releasable fastener may be releasably connected to the inner panel of the first airbag and the non-inflatable panel includes a second releasable fastener releasably connected to the inner panel of the second airbag.

The releasable fastener may be releasably connected to the inner panel of the first airbag and the non-inflatable panel includes a second releasable fastener releasably connected to the inner panel of the second airbag.

The releasable fastener may include hook and loop fasteners.

The non-inflatable panel may include a second releasable fastener releasably connected to the other of the first airbag or the second airbag.

The non-inflatable panel may be connected to the first airbag and the second airbag by a stitch.

The seat may include a seatback defining an occupant seating area, the first airbag and the second airbag surrounding the occupant seating area in the inflated position.

The occupant seating area may be between the non-inflatable panel and the seat when the first airbag and the second airbag are in the inflated position.

The first airbag and the second airbag may be supported by and extending from the seatback.

The non-inflatable panel may be seat-forward of the seatback when the first airbag and the second airbag are in the inflated position.

The first airbag and the second airbag may inflate in a seat-forward direction to the inflated position.

The non-inflatable panel may extend along a cross-seat midline when the first airbag and the second airbag are in the inflated position.

The non-inflatable panel may include a proximate end anchored relative to the seat and a distal end connected to the seat by the proximate end.

The non-inflatable panel may include a second releasable fastener spaced from the releasable fastener between the proximate end and the distal end, the second releasable fastener being releasably connected to one of the first airbag or the second airbag.

The releasable fastener may be releasably connected to the inner panel of the first airbag and the non-inflatable panel includes a second releasable fastener releasably connected to the inner panel of the second airbag.

With reference to the Figures, wherein like numerals indicate like parts throughout the several views, an assembly 10 for a vehicle 12 includes a seat 14. The assembly 10 includes a first airbag 16 and a second airbag 18 each supported by the seat 14. The airbags 16, 18 are inflatable to an inflated position. The assembly 10 includes a buckle 20 fixed to one of the first airbag 16 and the second airbag 18 and a clip 22 fixed to the other of the first airbag 16 and the second airbag 18. The clip 22 is releasably connected to the buckle 20. The assembly 10 includes a non-inflatable panel 24 having a joint fixed to the first airbag 16 and a releasable fastener 26 releasably connected to the second airbag 18.

In the event of an impact to the vehicle 12, the first airbag 16 and the second airbag 18 inflate to the inflated position to surround an occupant of the seat 14. The first airbag 16 and the second airbag 18 may control the kinematics of the occupant in the seat 14 and limit the occupant's interaction with other occupants in the event of an impact. The non-inflatable panel 24 may limit penetration by an occupant between the first airbag 16 and the second airbag 18 in the event of the impact when the first airbag 16 and the second airbag 18 are in the inflated position. The buckle 20 and clip 22 and the releasable fastener 26 of the non-inflatable panel 24 may be released to move the first airbag 16 and the second airbag 18 from surrounding the occupant. Specifically, after completion of the impact, the buckle 20 and clip 22 and the releasable fastener 26 of the non-inflatable panel 24 may be released by the occupant, or another, to separate the first airbag 16 and the second airbag 18 to allow the occupant to remove themselves from the seat 14 if needed.

With reference to FIG. 1, the vehicle 12 may be any suitable type of automobile, e.g., a passenger or commercial automobile such as a sedan, a coupe, a truck, a sport utility, a crossover, a van, a minivan, a taxi, a bus, etc. The vehicle 12, for example, may be autonomous. In other words, the vehicle 12 may be autonomously operated such that the vehicle 12 may be driven without constant attention from a driver, i.e., the vehicle 12 may be self-driving without human input.

The vehicle 12 includes a body (not numbered) including rockers, roof rails, pillars, body panels, vehicle floor (not numbered), vehicle roof (not numbered), etc. The vehicle 12 includes a passenger compartment (not numbered) to house occupants, if any, of the vehicle 12. The passenger compartment may extend across the vehicle 12, i.e., from one side to the other side of the vehicle 12. The passenger compartment includes a front end and a rear end with the front end being in front of the rear end during forward movement of the vehicle 12.

With continued reference to FIG. 1, the vehicle 12 may include one or more seats 14. Specifically, the vehicle 12 may include any suitable number of seats 14. The seats 14 are supported by a vehicle floor (not numbered). The seats 14 may be arranged in any suitable arrangement in the passenger compartment. As in the example shown in the Figures, one or more of the seats 14 may be at the front end of the passenger compartment, e.g., a driver seat 14 and/or a passenger seat 14. In other examples, one or more of the seats 14 may be behind the front end of the passenger compartment, e.g., at the rear end of the passenger compartment. The seats 14 may be movable relative to the vehicle floor to various positions, e.g., movable fore-and-aft and/or cross-vehicle. The seat 14 may be of any suitable type, e.g., a bucket seat.

The seats 14 include a seatback 28, a seat bottom (not numbered), and a head restraint (not numbered). The head restraint may be supported by and extending upwardly from the seatback 28. The head restraint may be stationary or movable relative to the seatback 28. The seatback 28 may be supported by the seat bottom and may be stationary or movable relative to the seat bottom. The seatback 28 may extend from an upper end to a lower end. The lower end may be connected to the seat bottom. The upper end of the seatback 28 may be spaced upwardly from the lower end of the seatback 28, i.e., upwardly from the seat bottom. The seatback 28, the seat bottom, and the head restraint may be adjustable in multiple degrees of freedom. Specifically, the seatback 28, the seat bottom, and the head restraint may themselves be adjustable. In other words, adjustable components within the seatback 28, the seat bottom, and the head restraint may be adjustable relative to each other.

Figure 2:
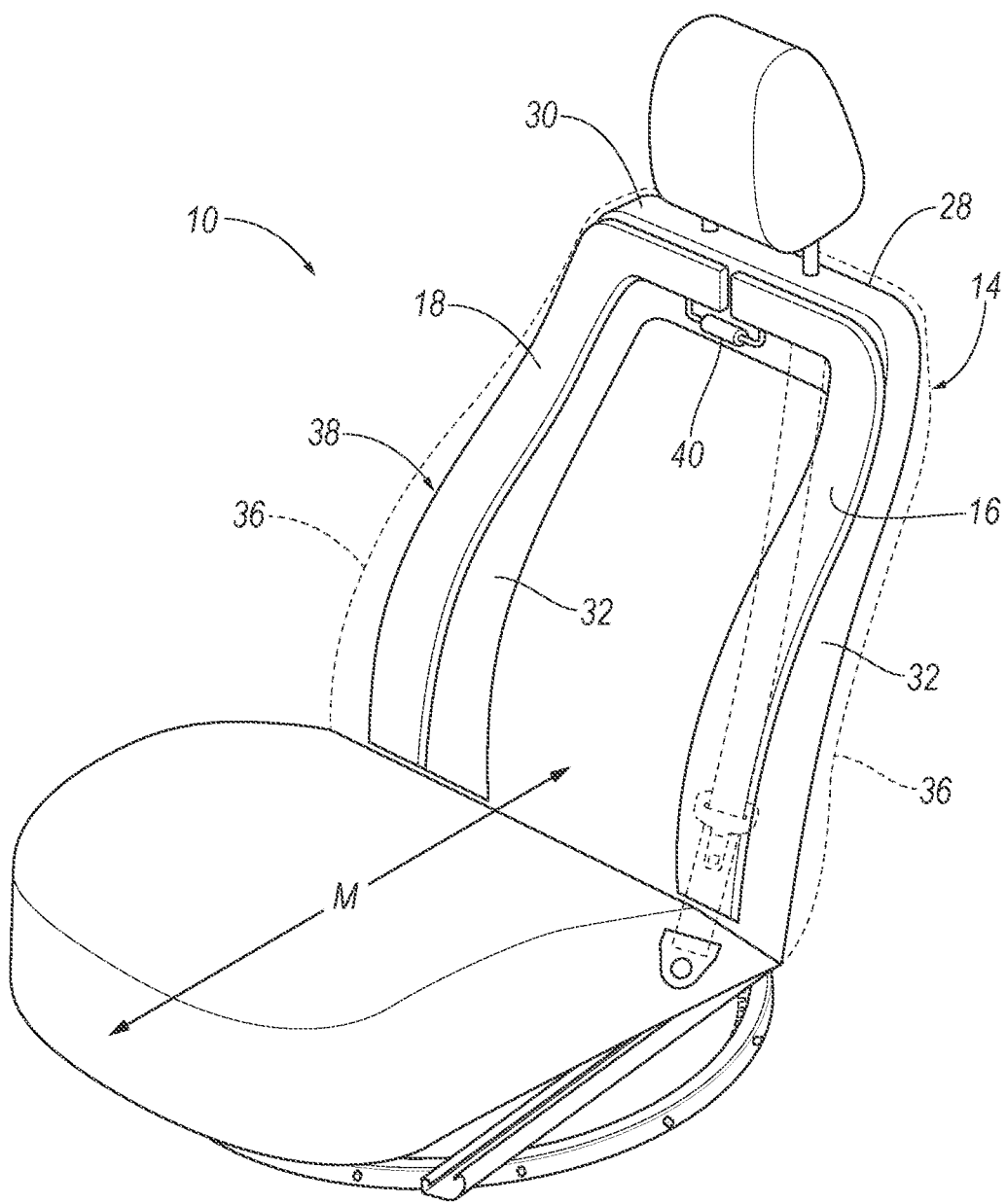
FIG. 2 is a perspective view of one of the seats of the vehicle having an airbag assembly in an uninflated position supported by a frame of the seat.
Figure 3:
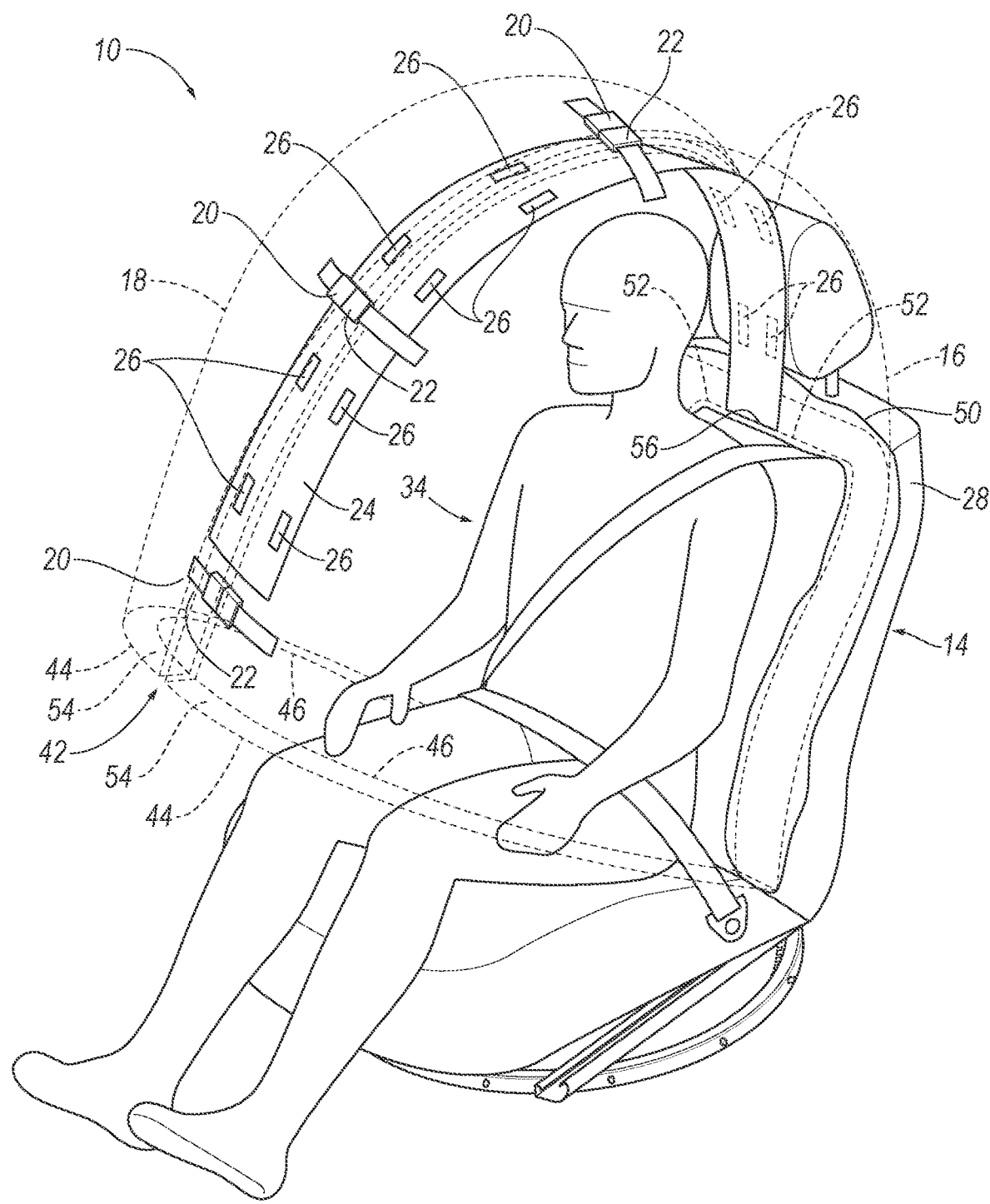
FIG. 3 is a perspective of the seat with a first airbag and a second airbag of the airbag assembly in an inflated position.
Figure 4:
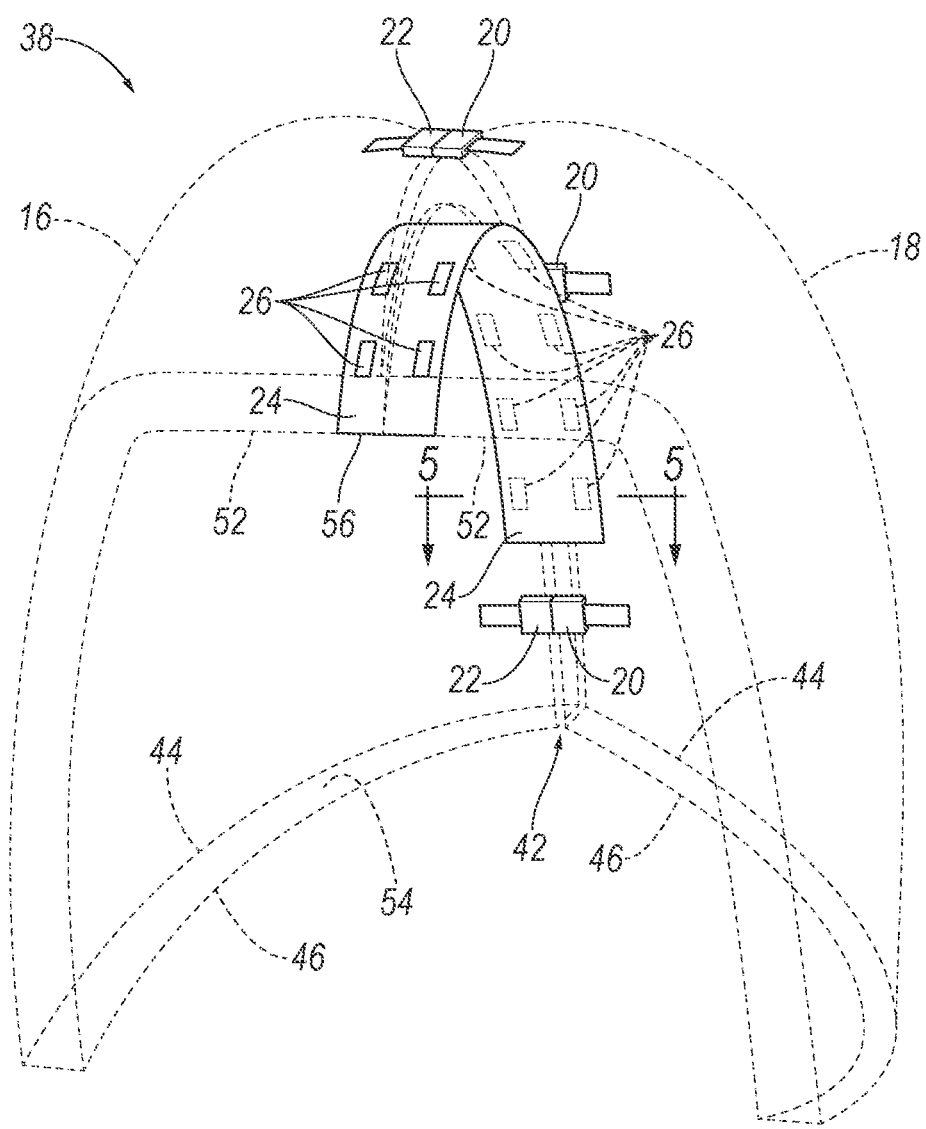
FIG. 4 is perspective view of the airbag assembly having the first airbag and second airbag releasably connected by a plurality of buckles and clips.

With reference to FIG. 2, the seatback 28 includes a frame 30 and a covering (not numbered) supported on the frame 30. The frame 30 may include tubes, beams, etc. Specifically, the frame 30 includes a pair of upright frame members 32. The upright frame members 32 are elongated, and specifically, are elongated in a generally upright direction when the seatback 28 is in a generally upright position. The upright frame members 32 are spaced from each other and the frame 30 includes one or move cross-members (not numbered) extending between the upright frame members 32. The frame 30, including the upright frame members 32, may be of any suitable plastic material, e.g., carbon fiber reinforced plastic (CFRP), glass fiber-reinforced semi-finished thermoplastic composite (organosheet), etc. As another example, some or all components of the frame 30 may be formed of a suitable metal, e.g., steel, aluminum, etc.

The covering may include upholstery, padding, and/or plastic portions. The upholstery may be cloth, leather, faux leather, or any other suitable material. The upholstery may be stitched in panels around the frame 30. The padding may be between the covering and the frame 30 and may be foam or any other suitable material.

Each seat 14 may rotate about an axis (not numbered) that extends through the vehicle roof and the vehicle floor. For example, the seats 14 may rotate between a forward-facing position and a rearward-facing position. In the forward-facing position, an occupant of the seat 14 faces the front end of the passenger compartment. In the rearward-facing position, an occupant of the seat 14 faces the rear end of the passenger compartment. The seats 14 may rotate completely, i.e., 360°, about the axis. The seats 14 may rotate between fixed positions, e.g., the forward-facing position and the rearward-facing position, or may be rotatable to an infinite number of positions.

The seat bottom and seatback 28 may define a cross-seat midline M. The cross-seat midline M may extend equidistantly from either side of the seat bottom and the seatback 28. When the seat 14 is in the forward-facing position or the rearward-facing position, the cross-seat midline M may extend along a vehicle-longitudinal axis, i.e., an axis that extends from the front end of the passenger compartment to the rear end of the passenger compartment. When the seat 14 is in a position offset from the forward-facing position or the rearward-facing position, the cross-seat midline M may be offset from the forward-facing position or the rearward-facing position.

With continued reference to FIG. 2, the seatback 28 defines an occupant seating area 34 of the seat 14. The occupant seating area 34 is the area occupied by an occupant when properly seated on the seat bottom and the seatback 28. The occupant seating area 34 is in a seat-forward direction of the seatback 28 and above the seat bottom. In the example shown in the Figures, the occupant seating area 34 faces the front end of the passenger compartment when the seat 14 is in the forward-facing position and the occupant seating area 34 faces the rear end of the passenger compartment when the seat 14 is in the rearward-facing position.

The seatback 28 may have bolsters 36 on opposite sides of the occupant seating area 34. The bolsters 36 are elongated, and specifically, are elongated in a generally upright direction when the seatback 28 is in a generally upright position. The bolsters 36 define cross-seat boundaries of the seatback 28, i.e., the seatback 28 terminates at the bolsters 36. The bolsters 36 may extend in a seat-forward direction relative to the occupant seating area 34, i.e., on opposite sides of the torso and shoulders of an occupant seated on the seat 14. The extension of the bolsters 36 relative to the occupant seating area 34 may be defined by the upright frame members 32 and/or the covering. In the example shown in the Figures, the size and shape of both the upright frame members 32 and the covering form the bolsters 36.

With reference to FIGS. 2-6, one or more of the seats 14 may include an airbag assembly 38. The airbag assembly 38 includes the first airbag 16, the second airbag 18, an inflator 40, and may include a housing (not shown). The vehicle 12 may include any suitable number of airbag assemblies 10. As one example, each of the seats 14 of the vehicle 12 may include one airbag assembly 38. In examples including more than one airbag assembly 38, the airbag assembly 38 may be identical or substantially identical to each other. As shown in FIG. 2, the airbag assembly 38 may extend along the frame 30 of the seat 14 when the airbags 16, 18 are in an uninflated position. Specifically, the airbags 16, 18 may extend along the upright frame members 32 and across an upper crossmember of the frame 30 of the seat 14.

The airbag assembly 38 is supported by the seatback 28. Specifically, the first airbag 16 and the second airbag 18 are each supported by the seat 14, specifically, the seatback 28. The airbag assembly 38, i.e., the first airbag 16 and the second airbag 18, is supported by the frame 30 of the seat 14 at the upper end of the seatback 28. In an example in which the airbag assembly 38 includes the housing, the housing may be fixed directly to the frame 30 of the seat 14, e.g., the frame 30 of the seatback 28. The airbag assembly 38 may be fixed to the upper end of the frame 30 of the seatback 28. The airbag assembly 38 may be concealed by the covering, e.g., the upholstery of the seat 14. In other words, the airbag assembly 38 may be between the frame 30 of the seat 14 and the upholstery of the seat 14. The covering may be releasable along the airbags 16, 18, e.g., the covering may include a tear seam along the frame 30 that is releasable as the airbags 16, 18 move from the uninflated position to the inflated position.

The first airbag 16 and the second airbag 18 are each inflatable from the uninflated position to the inflated position. In the inflated position, the first airbag 16 and the second airbag 18 each extend from the seatback 28 of the seat 14 and away from the seatback 28 of the seat 14. Both the first airbag 16 and the second airbag 18 inflate to the inflated position simultaneously, i.e., at the same time. The first airbag 16 may extend from one side of the seatback 28 and the second airbag 18 extends from the other side of the seatback 28. Specifically, the first airbag 16 extends from one of the bolsters 36 of the seatback 28 and the second airbag 18 extends from the other of the bolsters 36 of the seatback 28. The airbags 16, 18 extend around the occupant seating area 34 from one bolster 36 to the other bolster 36. Specifically, the airbags 16, 18 may be elongated in a round path from one bolster 36 to the other bolster 36. The airbags 16, 18 may extend in a rounded path from one bolster 36 to the other bolster 36 around the occupant seating area 34. The first airbag 16 and the second airbag 18 encloses the occupant seating area 34 between the airbags 16, 18 and the seatback 28 in the inflated position. Specifically, the airbags 16, 18 surround the occupant seating area 34 when the airbags 16, 18 are in the inflated position. The airbags 16, 18 may surround an occupant seated in the occupant seating area 34 when the airbags 16, 18 are in the inflated position. The first airbag 16 and the second airbag 18 are between the vehicle roof and the occupant seating area 34, i.e., overhead of the occupant in the occupant seating area 34. Accordingly, the airbags 16, 18 control the kinematics of the occupant seated in the seat 14 and may separate the occupant of the seat 14 from other vehicle occupants in the vehicle 12 in the event of the impact.

The first airbag 16 and the second airbag 18 extend from the bolsters 36 of the seatback 28 and converge to a gap 42. The gap 42 extends from the first airbag 16 to the second airbag 18. In the example shown in the Figures, the gap 42 may extend from the seatback 28 along the cross-seat midline M. In other examples, the gap 42 may be offset from the cross-seat midline M.

Figure 5:
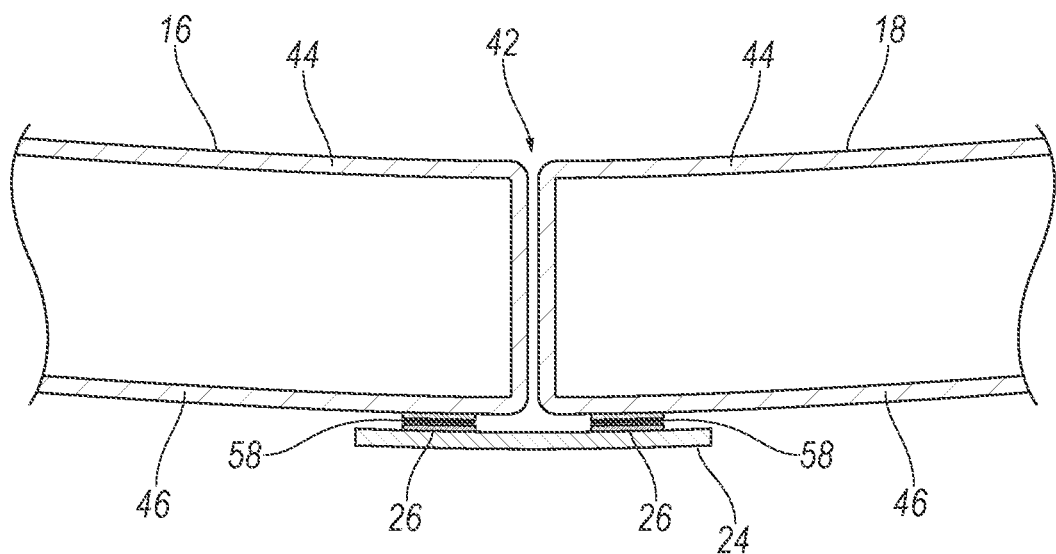
FIG. 5 is a cross-sectional view of the first airbag and the second airbag through Line 5 of FIG. 4.

As in the example shown in FIG. 5, the first airbag 16 and the second airbag 18 may abut each other at the gap 42. In other examples, the first airbag 16 and the second airbag 18 may be spaced from each other along part of or all of the gap 42. The first airbag 16 and the second airbag 18 each inflate in a seat-forward direction from the seatback 28 and converge to the gap 42. The seat-forward direction faces the same direction an occupant faces when seated in the seat 14. Specifically, the occupant seating area 34 is in a seat-forward direction of the seatback 28 and above the seat bottom. The first airbag 16 and the second airbag 18 inflates away from the seatback 28 in the seat-forward direction.

The first airbag 16 and the second airbag 18 each include an outer panel 44 and an inner panel 46. In the inflated position, the outer panels 44 of each of the airbags 16, 18 faces toward the passenger compartment and the inner panels 46 face toward the seat 14. In other words, the inner panels 46 are between the outer panels 44 and the seat 14. Specifically, the inner panel 46 faces toward the occupant seating area 34 and the occupant seated in the seat 14. In other words, the inner panel 46 is between the occupant and the outer panel 44. The outer panels 44 and the inner panels 46 may extend from the seatback 28, specifically, the bolsters 36 of the seatback 28, to the gap 42 between the first airbag 16 and the second airbag 18. In the event of an impact to the vehicle 12, the occupant of the seat 14 may contact the inner panel 46 and the first airbag 16 and the second airbag 18 may control the kinematics of the occupant.

The inflator 40 may be supported by the frame 30 of the seatback 28. The inflator 40 is fluidly connected to the first airbag 16 and the second airbag 18. In such an example, the inflator 40 expands the first airbag 16 and the second airbag 18 with inflation medium, such as a gas, to move the airbags 16, 18 from the uninflated position to the inflated position. In other examples, the airbag assembly 38 may include a second inflator 40 (not shown). In such an example, the inflator 40 may be fluidly connected to the first airbag 16 and the second inflator 40 may be fluidly connected to the second airbag 18. The inflator 40 may expand the first airbag 16 to the inflated position and the second inflator 40 may expand the second airbag 18 to the inflated position. The airbag assembly 38 may include any suitable number of inflators 40 to expand the first airbag 16 and the second airbag 18 to the inflated positions. The inflator 40 may be, for example, a pyrotechnic inflator that ignites a chemical reaction to generate the inflation medium, a stored gas inflator that releases (e.g., by a pyrotechnic valve) stored gas as the inflation medium, or a hybrid.

With reference to FIGS. 3-5 and 6, the assembly 10 includes the buckle 20 and the clip 22. The clip 22 is releasably connected to the buckle 20 when the airbags 16, 18 are in the inflated position. In other words, the clip 22 may be releasable from the buckle 20. As set forth below, the assembly 10 may include a plurality of buckles 20 and clips 22 arranged in pairs, i.e., each pair having one buckle 20 and one clip 22. The clip 22 is releasably engageable with the buckle 30. Specifically, the buckle 20 and the clip 22 may be of any suitable design so that the occupant can selectively engage and disengage the clip 22 and the buckle 20, including designs that are currently known. As one example, the buckle 20 may include a spring-loaded button that releasably engages a hole in the clip 22. In such an example, the buckle 20 and the clip 22 may be of the type or similar to the type conventionally used in seatbelt assembles. As another example, the buckle 22 may be a side-release buckle having resilient tabs that releasably engage slots in the clip 22. In examples including a plurality of pairs of buckles 20 and clips 22, the types of buckles 20 and clips 22 may vary based on the location of the pair of buckle 20 and clip 22. The assembly 10 may include any suitable number of pairs of buckles 20 and clips 22. The buckles 20 are sized to be packaged in the seatback 28. As an example, the buckles 20 may be about ¹/₂-1 inch thick.

In each pair of buckle 20 and clip 22, the buckle 20 is fixed to one of the first airbag 16 and the second airbag 18 and the clip 22 is fixed to the other of the first airbag 16 and the second airbag 18. In other words, when the buckle 20 is fixed to the first airbag 16, the clip 22 is fixed to the second airbag 18 and when the buckle 20 is fixed to the second airbag 18, the clip 22 is fixed to the first airbag 16.

When the buckles 20 and the clips 22 are releasably connected, the buckles 20 and the clips 22 extend across the gap 42 between the first airbag 16 and the second airbag 18. The buckles 20 and clips 22 maintain the gap 42 between first airbag 16 and the second airbag 18 in the inflated position. In other words, the first airbag 16 and the second airbag 18 are connected to each other by the buckles 20 and the clips 22. In the event of an impact to the vehicle 12 wherein the first airbag 16 and the second airbag 18 inflate to the inflated position and upon completion of the impact, the clips 22 may be released from the buckles 20 to separate the first airbag 16 from the second airbag 18 to allow an occupant to leave the seat 14 of the vehicle 12.

In some examples, the buckle 20 may be fixed to the outer panels 44 of one of the first airbag 16 and the second airbag 18 and the clip 22 may be fixed to the outer panel 44 of the other of the first airbag 16 and the second airbag 18. In such an example, the buckle 20 and clip 22 face upwardly from the airbags 16, 18, toward the passenger compartment, and away from the occupant seating area 34 of the seat 14. In other examples, the buckle 20 may be fixed to the inner panel 46 of one of the first airbag 16 and the second airbag 18 and the clip 22 may be fixed to the inner panel 46 of the other of the first airbag 16 and the second airbag 18. In such an example, the buckle 20 and the clip 22 face toward the occupant seating area 34 of the seat 14, i.e., toward the vehicle occupant of the seat 14.

As shown in FIGS. 3-6, the assembly 10 includes the non-inflatable panel 24 connected to the first airbag 16 and the second airbag 18. Specifically, the non-inflatable panel 24 is connected to the inner panels 46 of the first airbag 16 and the second airbag 18. In the example shown in the Figures, the non-inflatable panel 24 extends along the cross-seat midline M when the first airbag 16 and the second airbag 18 are in the inflated position. In other examples, the non-inflatable panel 24 may be offset from the cross-seat midline M when the gap 42 is offset from the cross-seat midline M. The non-inflatable panel 24 extends along the gap 42 between the first airbag 16 and the second airbag 18 when the airbags 16, 18 are in the inflated position. The non-inflatable panel 24 overlaps the gap 42 between the first airbag 16 and the second airbag 18 in the inflated position. As shown in the Figures, the first airbag 16 and the second airbag 18 may be between the buckles 20 and the clips 22 fixed to the outer panel 44 and the non-inflatable panel 24. The overlap of the gap 42 by the non-inflatable panel 24 may limit penetration between the first airbag 16 and the second airbag 18, i.e., through the gap 42, in the event of an impact to the vehicle 12.

The occupant seating area 34 of the seat 14 may be between the non-inflatable panel 24 and the seat 14 when the airbags 16, 18 are in the inflated position. Specifically, the non-inflatable panel 24 may be seat-forward of the seatback 28 of the seat 14 when the airbags 16, 18 are in the inflated position. The non-inflatable panel 24 may extend along the gap 42 and in-front and/or upwardly of the occupant seated in the occupant seating area 34, i.e., seat-forward of the seatback 28.

The non-inflatable panel 24 extends from a proximate end 52 to a distal end 54 along the gap 42 between the first airbag 16 and the second airbag 18. The proximate end 52 of the non-inflatable panel 24 may be anchored relative to the seat 14. Specifically, the non-inflatable panel 24 may be connected to the first airbag 16 and the second airbag 18 by a stitch 56 at the proximate end 52. The distal end 54 may be connected to the seat 14 by the proximate end 52 of the non-inflatable panel 24. The distal end 54 of the non-inflatable panel 24 may be movable relative to the airbags 16, 18 and the seat 14 and the proximate end 52 is fixed relative to the seat 14.

The non-inflatable panel 24 may be releasably connected to one of the first airbag 16 or the second airbag 18 between the proximate end 52 and the distal end 54. Specifically, the non-inflatable panel 24 includes the releasable fastener 26 between the proximate end 52 and the distal end 54. The releasable fastener 26 may be releasably connected to one of the first airbag 16 or the second airbag 18. The releasable fastener 26 may be connected to one of the first airbag 16 or the second airbag 18 between the proximate end 52 and the distal end 54.

As shown in the Figures, the non-inflatable panel 24 may include pairs of releasable fasteners 26, e.g., the non-inflatable panel may include a second releasable fastener 26 connected to the other of the first airbag 16 or the second airbag 18 between the proximate end 52 and the distal end 54. The pairs of releasable fasteners 26 may be spaced cross-vehicle from each other and releasable connected to the first airbag 16 or the second airbag 18. Specifically, the releasable fasteners may be connected to the inner panels 46 of the first airbag 16 and the second airbag 18. In other words, the releasable fasteners 26 may be spaced from each other across the gap 42 between the first airbag 16 and the second airbag 18 when the airbags 16, 18 are in the inflated positions.

The non-inflatable panel 24 may include any suitable number of releasable fasteners 26 spaced from each other along the gap 42 between the first airbag 16 and the second airbag 18 and on either side of the gap. The example shown in the Figures includes twelve releasable fasteners 26 along the gap 42, i.e., seven between the non-inflatable panel 24 and each of the first airbag 16 and the second airbag 18.

As in the example shown in the Figures, the releasable fasteners 26 may include hook and loop fasteners 58. In such an example, the hooks may be fixed to one of the airbags 16, 18 or the non-inflatable and the loops may be fixed to the other of the airbags 16, 18 or the non-inflatable panel 24. To release the non-inflatable panel 24 from the first airbag 16 and the second airbag 18, the hooks may be separated from the loops. In other examples, the releasable fasteners 26 may include snapping fasteners, e.g., plastic snapping fasteners. As with the hook and loop fasteners 58, the snapping fasteners allow the non-inflatable panel 24 to be releasable from the first airbag 16 and the second airbag 18.

Figure 6:
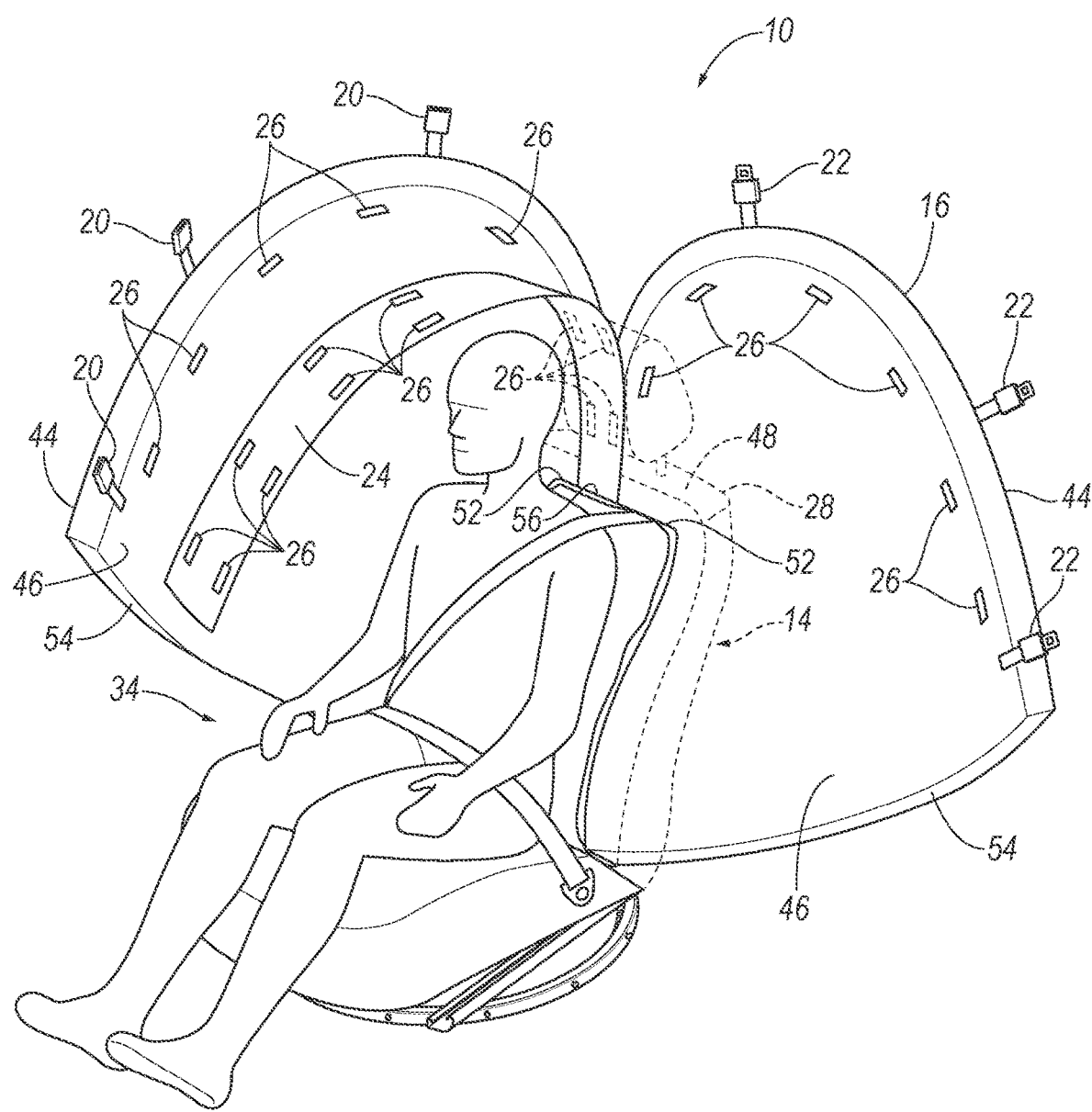
FIG. 6 is a perspective view of the seat with the buckles and clips released.

As shown in FIG. 6, the buckles 20 and clips 22 may be released from each other once an impact to the vehicle 12 is complete. The first airbag 16 and the second airbag 18 may be moved to expose an occupant of the seat 14 to the passenger compartment for the occupant to exit the vehicle 12. As shown in FIG. 6, for illustrative purposes, the non-inflatable panel 24 is shown released from the first airbag 16 and the second airbag 18 but still in the position where the non-inflatable panel 24 would be releasably connected to the first airbag 16 and the second airbag 18. In actuality, the non-inflatable panel 24 would be susceptible to gravity and would fall adjacent the seatback 28 of the seat 14.

The numerical adverbs "first" and "second" with respect to the airbags 16, 18 are used herein merely as identifiers and do not signify order or importance. The terms "first"and second" may be used interchangeably when referring to the airbags 16, 18 as shown in the Figures.

The airbags 16, 18 and non-inflatable panel 24 may be fabric, e.g., a woven polymer. For example, the fabric may be woven nylon yarn, for example, nylon 6, 6. Other examples of woven polymer include polyether ether ketone (PEEK), polyetherketoneketone (PEKK), polyester, etc. The woven polymer may include a coating, such as silicone, neoprene, urethane, etc. For example, the coating may be polyorgano siloxane.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An assembly comprising:
a seat;
a first airbag and a second airbag each supported by the seat and inflatable to an inflated position;
a buckle fixed to one of the first airbag and the second airbag and a clip fixed to the other of the first airbag and the second airbag, the clip being releasably connected to the buckle; and
a non-inflatable panel connected to the first airbag and the second airbag, the non-inflatable panel having a releasable fastener releasably connected to one of the first airbag or the second airbag.

2. The assembly of claim 1, wherein the first airbag and the second airbag each include an outer panel and an inner panel between the outer panel and the seat, the buckle being fixed to the outer panel of the one of the first airbag and the second airbag, the clip being fixed to the outer panel of the other of the first airbag and the second airbag, the non-inflatable panel being connected to the inner panel of the first airbag and the second airbag.

3. The assembly of claim 2, further comprising a second buckle and a second clip spaced from the buckle and the clip, the second buckle being fixed to one of the first airbag and the second airbag, the second clip fixed to the other of the first airbag and the second airbag, and the second clip being releasably connected to the second buckle.

4. The assembly of claim 3, wherein the second buckle is fixed to the outer panel of one of the first airbag or the second airbag and the second clip is fixed to the outer panel of the other of the first airbag or the second airbag.

5. The assembly of claim 3, wherein the second buckle is fixed to the inner panel of one of the first airbag or the second airbag and the second clip is fixed to the inner panel of the other of the first airbag or the second airbag.

6. The assembly of claim 5, wherein the releasable fastener is releasably connected to the inner panel of the first airbag and the non-inflatable panel includes a second releasable fastener releasably connected to the inner panel of the second airbag.

7. The assembly of claim 2, wherein the releasable fastener is releasably connected to the inner panel of the first airbag and the non-inflatable panel includes a second releasable fastener releasably connected to the inner panel of the second airbag.

8. The assembly of claim 1, wherein the releasable fastener includes hook and loop fasteners.

9. The assembly of claim 1, wherein the non-inflatable panel includes a second releasable fastener releasably connected to the other of the first airbag or the second airbag.

10. The assembly of claim 1, wherein the non-inflatable panel is connected to the first airbag and the second airbag by a stitch.

11. The assembly of claim 1, wherein the seat includes a seatback defining an occupant seating area, the first airbag and the second airbag surrounding the occupant seating area in the inflated position.

12. The assembly of claim 11, wherein the occupant seating area is between the non-inflatable panel and the seat when the first airbag and the second airbag are in the inflated position.

13. The assembly of claim 1, wherein the seat includes a seatback, the first airbag and the second airbag being supported by and extending from the seatback.

14. The assembly of claim 13, wherein the non-inflatable panel is seat-forward of the seatback when the first airbag and the second airbag are in the inflated position.

15. The assembly of claim 1, wherein the first airbag and the second airbag inflate in a seat-forward direction to the inflated position.

16. The assembly of claim 1, wherein the non-inflatable panel extends along a cross-seat midline when the first airbag and the second airbag are in the inflated position.

17. The assembly of claim 1, wherein the non-inflatable panel includes a proximate end anchored relative to the seat and a distal end connected to the seat by the proximate end.

18. The assembly of claim 17, wherein the non-inflatable panel includes a second releasable fastener spaced from the releasable fastener between the proximate end and the distal end, the second releasable fastener being releasably connected to one of the first airbag or the second airbag.

19. The assembly of claim 18, wherein the first airbag and the second airbag each include an outer panel and an inner panel between the outer panel and the seat, the releasable fastener being releasably connected to the inner panel of the first airbag and the non-inflatable panel includes a second releasable fastener releasably connected to the outer panel of the second airbag.

* * * * *